Aug. 18, 1925.  
L. KRIEGER  
1,550,441  
TRANSMISSION GEAR OF AUTOMOBILE VEHICLES  
Filed July 1, 1920

INVENTOR  
Louis Krieger  
BY Townsend & Decker  
ATTORNEYS

Patented Aug. 18, 1925.

1,550,441

UNITED STATES PATENT OFFICE.

LOUIS KRIEGER, OF PARIS, FRANCE.

TRANSMISSION GEAR OF AUTOMOBILE VEHICLES.

Application filed July 1, 1920. Serial No. 393,411.

*To all whom it may concern:*

Be it known that I, LOUIS KRIEGER, of 3 Rue Ampere, Paris, France, engineer, have invented new and useful Improvements in the Transmission Gears of Automobile Vehicles, which improvements are fully set forth in the following specification.

This invention has for its object an arrangement of transmission gear of automobile vehicles which allows the wheels to rise independently when passing over obstacles or the like; the wheels can take an oblique position with respect to their first position or, in other words, change the inclination of their plane of rotation with respect to the horizontal plane in which the vehicle normally moves.

According to this invention each wheel is driven by a rigid shaft jointed to its drive by a jointed coupling arrangement, such as a Cardan joint or the like, at the level of the axis of the vehicle or as near to it as possible; the inclination of the wheels is then maintained either by the vertical movement of the bearings of the driving shaft relative to the differential or by one or more connecting rods jointed in a vertical plane or otherwise either to the axle journal and turning in a vertical plane about the driving differential or by a tube in one with the journal and surrounding the half shaft provided with a Cardan joint and jointed to the differential casing so that it can move in a vertical plane, the axis of articulation coinciding with the axes of the Cardan joint.

The suspension springs supporting the chassis of the vehicle are arranged transversely in one or more layers of one or more springs arranged either above, at the level of, or below the axis of the journal jointed or otherwise to this latter, but whose prolongation may be such that it agrees with the inclination of the wheels in their upward movements.

Also, in order to avoid the necessity of the prolongation of the springs agreeing with the displacement of the driving shafts (which might lead to substantial initial bendings in certain cases) the end of the suspension spring or springs may be jointed to the journals of the wheels by links or a ball joint in the wheel itself may be employed which will allow a slight longitudinal movement of the driving shaft of the differential in its bearing.

Figure 1:
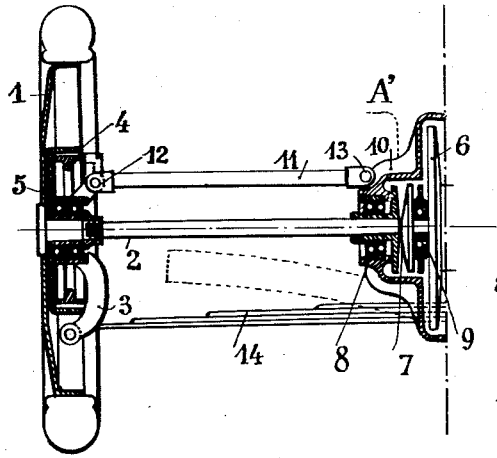
Figure 2:
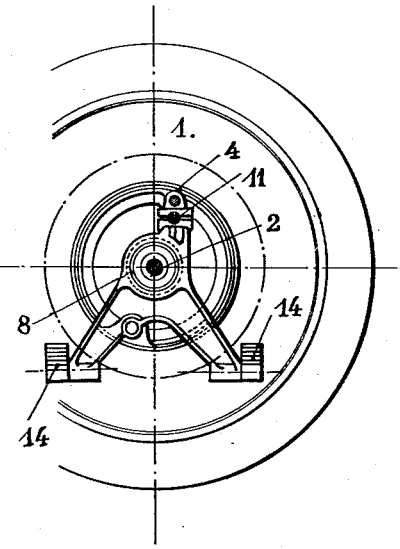
Figure 3:
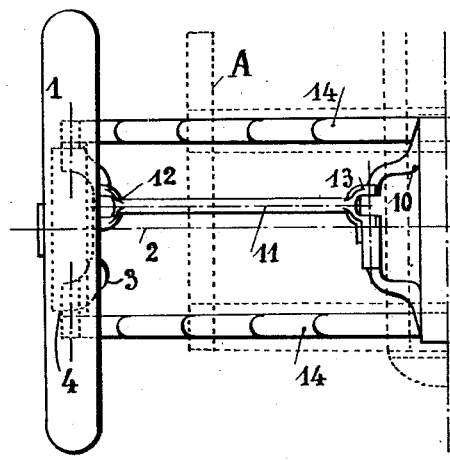
Figure 4:
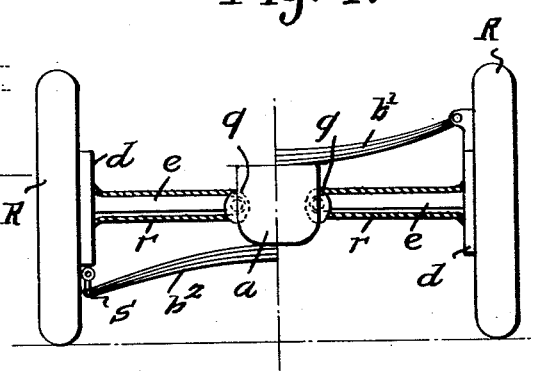

The invention is illustrated in the accompanying drawings, in which Figure 1 is a half transverse elevation, Figure 2 is a plan, Figure 3 a half plan of the transmission gear and Figure 4 an end view of a modification.

1 is the wheel rigidly fixed upon the driving shaft 2. 3 is an arm of the axle journal and 4 the brake drum. The journal is mounted with the interposition of a ball bearing 5; 6 is the driving differential. The shaft 2 is coupled to the differential shaft through the intermediary of a coupling 7 forming a universal joint and universal bearings 8 and 9 therefor are interposed both between the differential casing 10 and the shaft 2 and between the coupling 7 and the differential element or member 6 which allows the driving shaft to follow the movement of the inclination of the wheel. A connecting rod 11 jointed in a vertical plane at 12 and 13 both to the wheel journal and to the differential casing 10 serves to compensate the tendency of the wheel to tilt.

This connecting rod may be eliminated but in this case it will be necessary at the level of the wheel or at the level of the differential to prevent longitudinal movements of the driving shaft 2.

14 are the suspension springs of the vehicle jointed to the journal 3 and supporting a chassis A of any known type.

The arrangement of the transmission gearing in question is equally applicable to an automobile vehicle having a chassis A as to a vehicle in which the chassis is replaced by a single axial beam A'.

Of course any other arrangement of universal joint between the driving shaft fixed rigidly to the wheel and the differential shaft may be employed without altering the principle of the invention.

In the modification shown in Figure 4 the movements of inclination are compensated by a tube $r$ surrounding the shaft $e$ having at its end a Cardan joint. This tube is in one with the journal $d$ and is jointed in a vertical plane to the differential casing or to the axial beam the axis of articulation coinciding with the axes of the Cardan joint.

In order to avoid the necessity of the prolongation of the suspension spring coinciding with the displacement of the driving shaft, the end of the suspension spring or springs $b^2$ may be jointed to the journals by links $s$ (half view on the left of Figure 4).

What I claim is:—

1. Transmission gear for automobile vehicles adapted to allow the wheels to rise independently, in which each wheel is free to incline its plane of rotation to the plane of the horizontal, comprising a drive shaft rigidly secured to the wheel for driving the same and a jointed driving coupling through the intermediary of which only said shaft is jointed to the driving member of the differential, said shaft being free between its attachment to the wheel and the jointed driving coupling to permit movements of inclination of the wheel to be compensated by movements of said coupling.

2. In a transmission gear for automobile vehicles, a differential, a differential casing, a floating half axle connected to said differential by a Cardan joint, a driving wheel connected rigidly to the said half axle, a bearing on the outer end of said axle, a connecting rod jointed to said casing and to said bearing, and a pair of springs connected to said casing and jointed to said bearing, said springs being disposed in spaced relation horizontally to prevent horizontal movement of said axle.

3. In a transmission gear for automobile vehicles, the combination of a differential casing rigid with the vehicle frame, a floating half axle free to move in a vertical plane at right angles to the vehicle frame, a wheel rigidly connected to the said axle, a bearing on the outer end of said axle, a flexible joint between said axle and said casing to compensate movements of said axle, a pair of transverse springs spaced horizontally and jointed to said bearing and connected to said casing to prevent horizontal movements of said axle, and a connecting rod jointed to said casing and said bearing to preserve a substantially spaced relation between said wheel and said casing.

In testimony that I claim the foregoing as my invention I have signed my name this 16th day of June, 1920.

LOUIS KRIEGER.